Aug. 19, 1952    J. McEWAN    2,607,243
SAW SHARPENER

Filed Nov. 25, 1949    3 Sheets-Sheet 1

FIG. 1.

INVENTOR
JAMES McEWAN
BY Harper Allen
ATTORNEY

Aug. 19, 1952        J. McEWAN        2,607,243
SAW SHARPENER
Filed Nov. 25, 1949        3 Sheets-Sheet 2
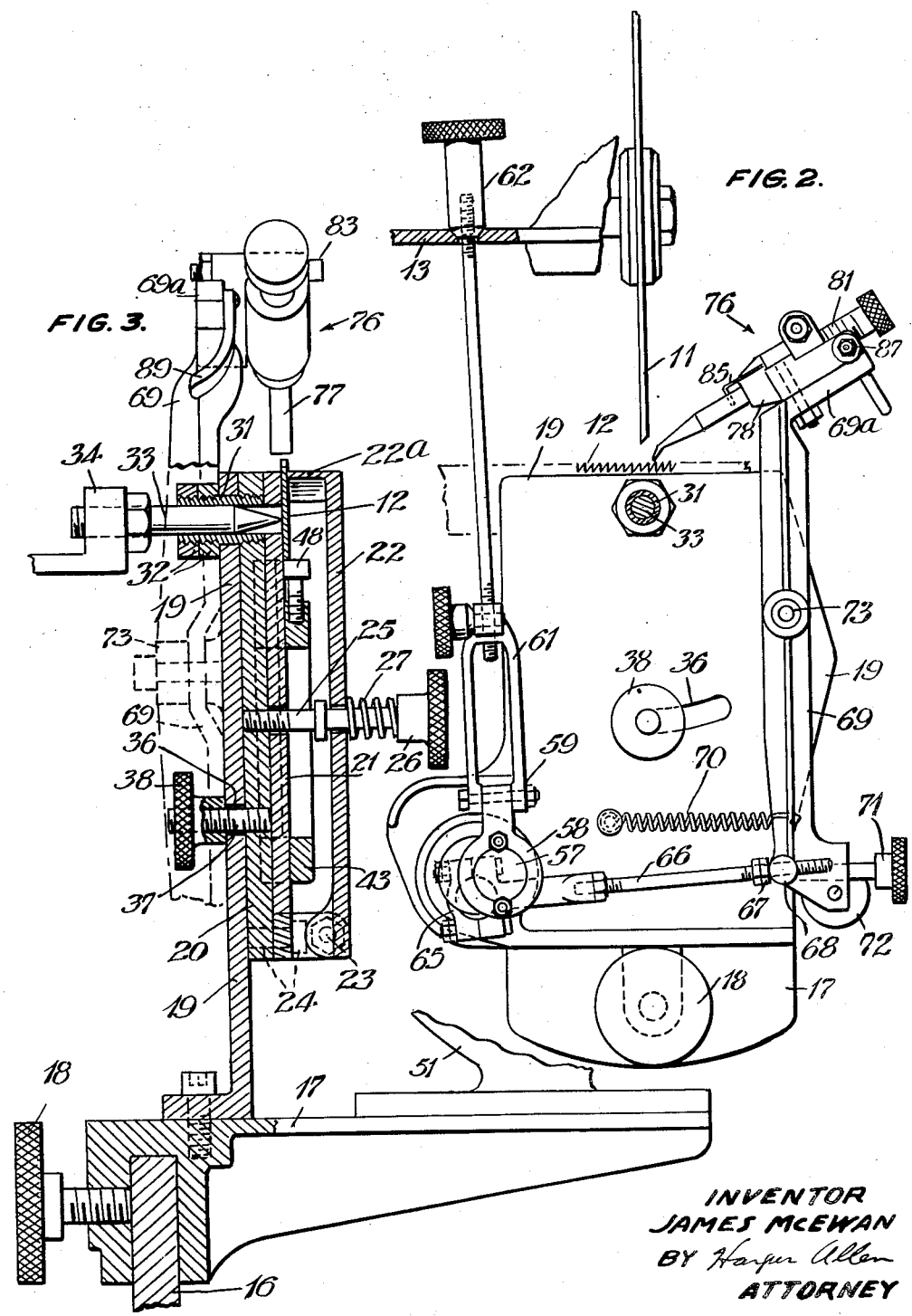
INVENTOR
JAMES McEWAN
BY Harper Allen
ATTORNEY

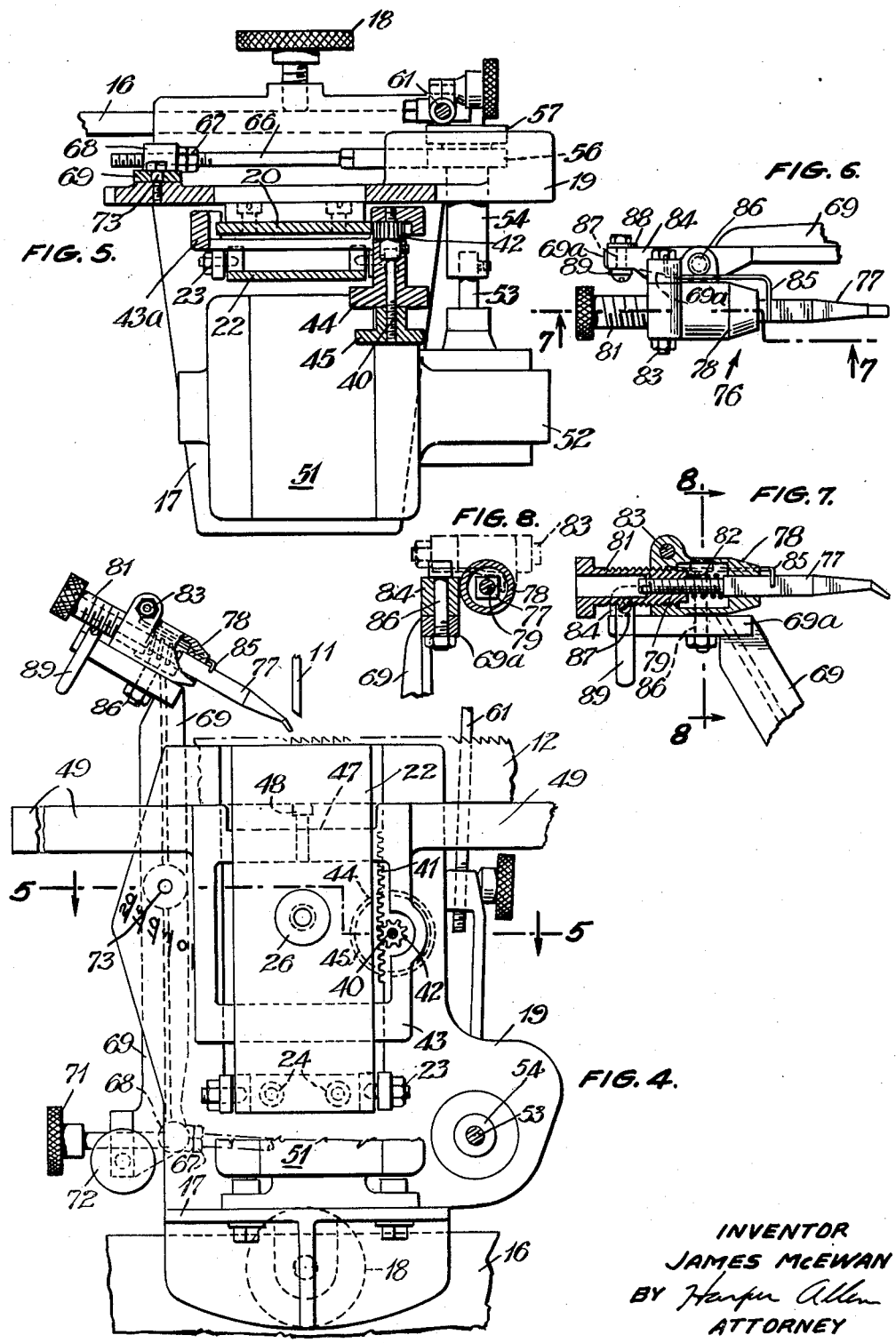

Patented Aug. 19, 1952

2,607,243

UNITED STATES PATENT OFFICE 2,607,243

SAW SHARPENER

James McEwan, San Jose, Calif.

Application November 25, 1949, Serial No. 129,459

3 Claims. (Cl. 76—40)

1

The present invention relates to saw sharpeners and is concerned more particularly with a saw sharpening device having automatic feeding of the sharpening element and the saw in timed relation with respect to each other.

The invention has for its objects among others the provision of an improved sharpening device of the above character in which a desirable timed relation is provided in the feeding of the saw with respect to the sharpening device, in supporting and mounting various types and sizes of saws with respect to the sharpening device, as well as providing an advantageous and fine adjustment of the feed pawl with respect to the teeth of various saws of different tooth spacing.

The above and other objects of the invention are attained in connection with a preferred embodiment of the invention illustrated in the accompanying drawings, in which:

Figure 1 is an elevational view of a saw sharpener embodying the invention.

Figure 2 is an enlarged fragmentary elevational view illustrating the relation of the drive for both the sharpening element and the feed pawl.

Figure 3 is a vertical sectional view of the saw holder and its mounting taken as indicated by the line 3—3 in Figure 2.

Figure 4 is an elevational view of the saw supporting bracket and mechanism taken from the opposite side from the Figure 2 elevational view.

Figure 5 is a horizontal sectional view taken as indicated by the lines 5—5 in Figure 4.

Figure 6 is a plan view of the feed pawl and its mounting.

Figure 7 is a vertical sectional view taken as indicated by the line 7—7 in Figure 6.

Figure 8 is a sectional view taken as indicated by the line 8—8 in Figure 7.

The invention as described in connection with a saw sharpener of the type disclosed and claimed in my co-pending application, Serial 779,001, filed October 10, 1947, now Patent No. 2,590,992, dated April 1, 1952, for Saw Sharpeners, to which reference is made for details of construction not disclosed herein. Referring to Figure 1 there is shown a saw sharpener including a base 10 on which a saw sharpening element or grinding wheel 11 is mounted for straight line vertical movement with respect to a saw 12 by means of its supporting bracket 13 of the type disclosed and claimed in said application. The saw sharpener includes a supporting bracket 14 having a rib 16 on which the base 17 of the saw support is secured by means of a clamping screw 18. A vertical support bracket or plate 19 is bolted on the

2 base 17 and at its upper end carries saw clamping and supporting means as will now be described.

The saw clamping means comprises a mounting plate 20, (Figures 2, 3, and 5) which carries a pair of saw clamps or brackets 21 and 22 pivotally connected to each other at 23. The bracket 21 is secured to the plate 20 by screws 24. The bracket 22 is apertured to receive a stud 25 threaded in the plate 20 and the bracket 21 and carrying a clamping nut 26. The nut engages a spring 27 by means of which an appropriate amount of frictional pressure can be applied to the saw 12 between the upper end of the bracket 21 and a lateral extension 22a of the clamping bracket 22. To provide for pivotal adjustment of the clamping assembly on the support bracket 19 a sleeve 31 is threaded into the plate 20 and is journalled in a suitable aperture of the support bracket 19 being held in place by means of respective clamping and lock nuts 32. The sleeve 31 is pivotally received on a stud 33 carried by the dust chute 34 of the sharpener. The support bracket 19 is provided with an arcuate slot 36 (Figures 2 and 3) having the axis of the stud 33 as a center. A stud 37 secured in the plate 20 extends through the slot 36 to receive a clamping nut 38. It will be noted that the axis of the stud 33 is closely adjacent the teeth of the saw 12 so that in effect the adjustment is made substantially with reference to the teeth in determining the amount of rake given to the teeth of the saw in making a cut. The extent of the angular adjustment desired can be determined with reference to graduations marked 0, 5, 10, 15, and 20 in Figure 4 which are read with reference to the edge of the saw supporting slide 43.

In order to support various sizes of saws and to support a given saw in the desired relation with respect to the grinding wheel 11, the clamping bracket 21 is provided along one vertical edge with a series of gear teeth 41 forming a rack for engagement by a pinion 42 journalled on a stud 40 in a saw supporting slide 43. The pinion 42 has a thumb nut 44 secured thereon having a lock nut 45 associated therewith. The saw supporting slide 43 is provided with edge guide portions 43a which are grooved to slide on the bracket 21 as best seen in Figure 5. The slide 43 has a transverse rib 47 extending across between the clamping brackets 21 and 22 and carrying a support stud 48 threaded therein for adjustment on which the saw blade 12 rests. Also the slide 43 is provided with oppositely extending wings or arms 49 (Figures 1 and 4) of any desired length so that a band saw supported on the stud 48 and slidably clamped in the saw supporting assembly has two other points of support on the respective wings 49.

The feeds for the grinding wheel and the saw are operated in timed relation to each other and for this purpose a motor 51 (Figure 5) is mounted on the frame bracket 17 and has its gear head 52 provided with a laterally extending drive shaft 53 connected to an eccentric assembly 54 suitably journalled in the support bracket 19. The assembly 54 has a pair of adjacent eccentrics 56 and 57 thereon. The eccentric 57 (Figures 2 and 5) is provided with a follower 58 pivotally connected at 59 to an adjustable connecting link 61 which extends through an aperture in the support bracket 13 for the grinding wheel. The link 61 is provided with a drive nut 62 adjustably threaded thereon to control the in-and-out movement of the grinding wheel 11 with respect to the saw 12. The arrangement provides for positive inward feeding of the wheel 11 with respect to a saw tooth and spring-urged return thereof.

The eccentric 56 (Figures 2 and 5) has its follower 65 connected by a push link 66 and a drive nut 67 thereon with an apertured stud 68 at the lower end of a drive arm 69. Drive arm 69 carries a stop screw 71 in a split threaded boss for engagement with the bracket 19 under the influence of spring 70. Adjustment of the stop screw 71 is maintained by a clamping screw 72 extending transversely through the split boss. The arm 69 (Figures 2 and 4) is pivoted at 73 and carries at its upper end 69a a feed pawl assembly 76 referred to in greater detail hereinafter.

The feed pawl assembly 76 (Figures 6, 7 and 8) includes a feed pawl 77 having a rectangular body received in a similar opening of a tubular housing 78. The left hand end of the feed pawl is turned to a reduced diameter and is threaded at 79 to engage within an internal thread of a tubular nut 81 which is also threadedly engaged within the tubular housing 78. The threads on the inside diameter of the tubular nut 81 are of the same hand as the threads on the outside but are greater in number per inch. As a result, turning of the nut 81 adjusts the pawl by an amount proportional to the difference in pitch of the threads to provide a fine incremental adjustment of the feed pawl 77 with respect to the housing 78 upon turning of the nut 81. A compression spring 82 within the housing 78 between the square portion of the feed pawl 77 and the end of the nut 81 provides a slight friction on the adjustment to maintain a desired setting.

The housing 78 is pivotally mounted at 83 on an upright arm of a support bellcrank 84 and is urged clockwise (Figure 7) to active position by a spring wire 85. The horizontal arm of the support bellcrank 84 extends along the end 69a of the lever 69 and is pivoted thereto at 86. The horizontal arm of the support bellcrank 84 carries a transverse bolt 87 carrying a washer 88 overlapping one side of the end portion 69a and an arm 89 overlapping the other side of the end portion 69a to maintain the desired alignment of the pawl assembly. By adjusting the arm 89, the pawl assembly 76 becomes free to be swung to an inoperative position.

In operation, the saw 12 to be sharpened is placed between clamping brackets 21 and 22 with the slide 43 and the stud 48 adjusted to the desired height to present the saw tooth to the wheel for the proper depth of cut. This depth of cut is also determined in part by the adjustment of the connecting link 61. The stop 71 (Figure 2) is set in accordance with the desired tooth-by-tooth feed of the saw by the pawl 77 and operation of the machine is started. The timing of the feed of the pawl and the downward stroke of the grinding wheel is determined by the relative angular settings of the eccentrics 56 and 57. Preferably, these eccentrics are adjusted so that the grinding wheel is at the top of its feed 90° ahead of the forward feed point of the pawl. Also the forward feed of the pawl starts from its rearward position at the time the grinding wheel is at its highest position and its forward feed is completed at a point when the grinding wheel is returned about half way toward engagement of the tooth. The pawl is withdrawn well ahead of the remaining descent of the grinding wheel to grind the tooth which has just been advanced to sharpening position by the feed pawl 77.

While I have shown a preferred embodiment of the invention it will be understood that the invention is capable of variation and modification from the form shown so that its scope should be limited only by the scope of the claims appended hereto.

I claim:

1. In a saw sharpener, a sharpening element, a supporting bracket, a pair of opposed saw clamping members, means pivotally connecting and supporting said saw clamping members on said supporting bracket for angular adjustment of said clamping members, means pivotally connecting said clamping members together, means yieldably urging said members together about said latter pivotal connection to enable a saw blade to be frictionally clamped between said clamping members while presenting the teeth of the saw blade to the sharpening element, a saw blade support between said clamping members slidably mounted on one of said clamping members for adjustment toward and away from said sharpening element, means for effecting said adjustment of said saw blade support, and means for feeding the saw blade in step-by-step fashion along said clamping members and said saw blade support to present the teeth thereof to said sharpening element; said feeding means including a housing, a feed pawl slidably and non-rotatably engaged with said housing, and an adjusting nut threaded within said housing and on said pawl, the threads of the threaded connection on said pawl being of lesser pitch than those of the threaded connection within said housing to provide for a fine increment of adjustment of said pawl.

2. In a saw sharpener, a sharpening element, a supporting bracket, a pair of opposed saw clamping members, means pivotally connecting and supporting said saw clamping members on said supporting bracket for angular adjustment of said clamping members, means pivotally connecting said clamping members together, means yieldably urging said members together about said latter pivotal connection to enable a saw blade to be frictionally clamped between said clamping members while presenting the teeth of the saw blade to the sharpening element, a saw blade support between said clamping members slidably mounted on one of said clamping members for adjustment toward and away from said sharpening element, means for effecting said adjustment of said saw blade support, means for feeding the saw blade in step-by-step fashion along said clamping members and said saw blade support to present the teeth thereof to said sharpening element; said feeding means including a housing, a feed pawl slidably and non-rotatably engaged with said housing, and an adjusting nut threaded within said housing and on said pawl, the threads of the threaded connection on said pawl being of lesser pitch than those of the threaded connection within said housing to provide for a fine increment of adjustment of said pawl; and means for adjustably supporting said housing for movement relative to the saw blade to enable the housing to be moved to a position away from the saw blade.

3. A saw sharpener as recited in claim 1, in which said housing includes means forming a square opening and said feed pawl includes a square shank slidably received in said square opening, and a spring interposed between the tubular nut and the square shank of said feed pawl.

JAMES McEWAN.

REFERENCES CITED

The following references are of record in the file of this patent:

UNITED STATES PATENTS

| Number | Name | Date |
|---|---|---|
| 48,120 | Warner | June 6, 1865 |
| 1,049,980 | Berry | Jan. 7, 1913 |
| 1,193,643 | Wardwell, Jr. | Aug. 8, 1916 |
| 1,501,564 | Lifflander | July 15, 1924 |
| 1,783,826 | Burke | Dec. 2, 1930 |
| 1,772,701 | Brown | Aug. 12, 1930 |
| 1,874,315 | Laurent | Aug. 30, 1932 |
| 1,909,832 | Jirka | May 16, 1933 |
| 1,974,882 | Martin | Sept. 25, 1934 |
| 2,338,271 | Ulanet | Jan. 4, 1944 |
| 2,343,171 | Collier | Feb. 29, 1944 |
| 2,371,572 | Lindsey | Mar. 13, 1945 |
| 2,379,642 | Kiechle | July 3, 1945 |
| 2,470,290 | Chryst | May 17, 1949 |
| 2,535,439 | McEwan | Dec. 26, 1950 |
| 2,547,553 | Battocchi | Apr. 3, 1951 |
| 2,570,118 | Hamberger | Oct. 2, 1951 |